March 27, 1951 T. J. STAHL 2,546,279
ARM AND WHEEL FOR LAWN MOWERS
Filed Jan. 10, 1950
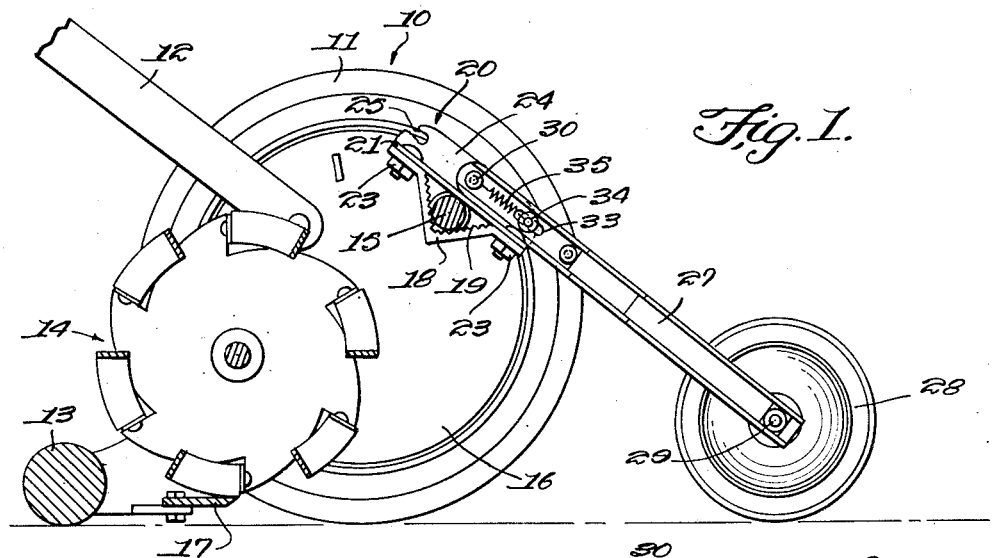
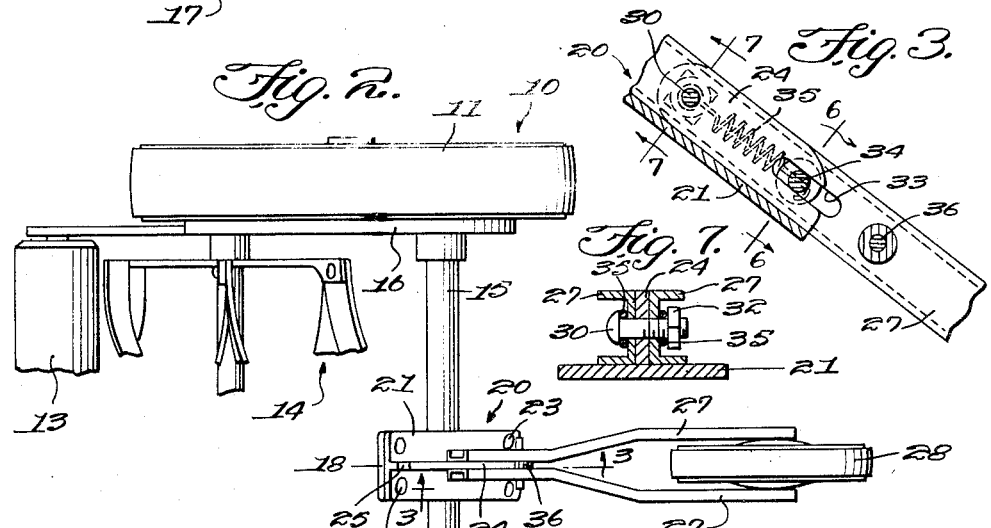
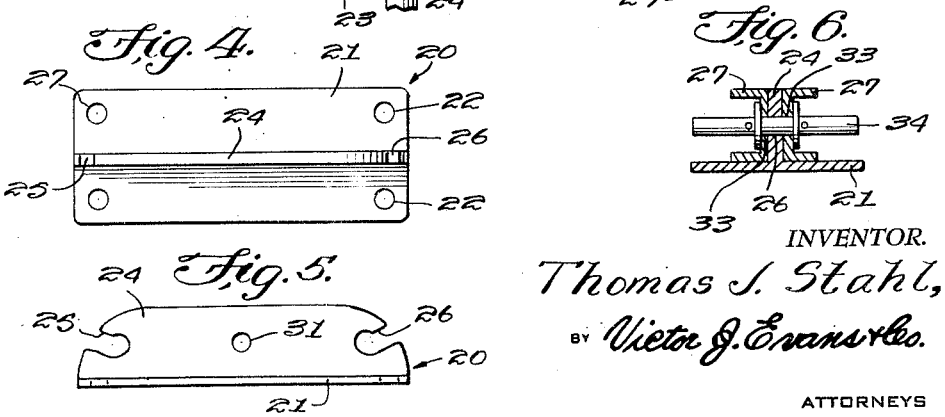
INVENTOR.
Thomas J. Stahl,
BY Victor J. Evans & Co.
ATTORNEYS Patented Mar. 27, 1951

2,546,279

UNITED STATES PATENT OFFICE 2,546,279

ARM AND WHEEL FOR LAWN MOWERS

Thomas J. Stahl, Long Beach, Calif.

Application January 10, 1950, Serial No. 137,752

2 Claims. (Cl. 56—253)

This invention relates to a lawnmower, and more particularly to a supplemental wheel assembly for lawnmowers of the hand-operated, side-wheel driven type.

The object of the invention is to provide an attachment for lawnmowers which will allow the lawnmower to be used for cutting the edge of the lawn by supporting the cutter when one of the driven wheels overhangs the edge of the lawn.

Another object of the invention is to provide a wheel for attachment to a lawnmower whereby the cut will be maintained level and the driving wheels will be maintained horizontal when a portion of the lawnmower overhangs the edge of a lawn, the wheel being mounted for movement into and out of engagement with the lawn.

A further object of the invention is to provide a lawnmower attachment which is extremely simple and inexpensive to manufacture.

Other objects and advantages of the invention will be apparent during the course of the following description.

In the drawings forming a part of this application, and in which like numerals are used to designate like parts throughout the same:

Figure 1 is a vertical, transverse, sectional view taken through a lawnmower equipped with the wheel assembly of the present invention;

Figure 2 is a fragmentary top plan view of the lawnmower equipped with the wheel assembly of the present invention;

Figure 3 is an enlarged, sectional view taken on the line 3—3 of Figure 2;

Figure 4 is an enlarged, top plan view of the bracket;

Figure 5 is a side elevational view of the bracket;

Figure 6 is an enlarged, sectional view taken on the line 6—6 of Figure 3;

Figure 7 is an enlarged sectional view taken on the line 7—7 of Figure 3.

Referring in detail to the drawings, the numeral 10 designates a portion of a conventional hand-operated, side-wheel driven type of lawnmower. The lawnmower 10 includes the usual side wheels 11 and the handles 12 for moving the lawnmower along the lawn to be trimmed. Further, the lawnmower 10 includes a horizontally disposed roller 13, there being a rotary cutter 14 for coacting with the stationary blade 17 to shear the grass therebetween. A horizontally disposed tie rod 15 extends between the side frames 16 of the lawnmower 10 and is secured thereto.

The present invention is directed to a wheel mechanism whereby the lawnmower will be supported when one of the side wheels 11 overhangs the edge of the lawn, so that the grass can be cut evenly at all times. The wheel assembly of the present invention includes a plate 18 that is provided with a V-shaped recess for receiving therein a portion of the tie rod 15. The portion of the plate 18 that is arranged in engagement with the tie rod 15 is provided with a plurality of serrations or teeth 19, so as to prevent accidental movement of the plate 18 on the tie rod 15, Figure 1.

Arranged on the opposite side of the tie rod 15 is a bracket 20, the bracket 20 including a base 21 that is provided with a plurality of spaced openings 22. Suitable securing elements, such as the bolt-and-nut assemblies 23, are adapted to be inserted through the openings 22 and into engagement with the plate 18 for maintaining the plate 18 and bracket 20 assembled on the tie rod 15. Projecting upwardly from the base 21 of the bracket 20 and secured thereto or formed therewith is a vertically disposed web 24, the web 24 being provided with a pair of notches 25 and 26 on its ends for a purpose to be subsequently described, Figure 5.

Arranged on opposite sides of the web 24 is a pair of spaced, coacting arms 27. An axle 29 rotatably connects a wheel 28 to the free ends of the arms 27, and the wheel 28 is mounted for movement into and out of engagement with the ground or lawn. A bolt 30 provides a pivotal connection between the other ends of the arms 27 and the web 24. Thus, the bolt 30 extends through one of the arms 27, then through an opening 31 in the web 24 of the bracket 20, and then through the other arm 27. A suitable nut 32 is arranged in threaded engagement with the bolt 30 for maintaining the parts in assembled relation.

Each of the arms 27 is provided with a slot 33, the pair of slots 33 being arranged in alignment with each other. A lock pin 34 projects through the opposed or aligned slots 33, and the lock pin 34 is mounted for movement into and out of one of the notches 25 or 26, depending on whether or not the wheel 28 is being used. For normally urging the lock pin 34 into one of the notches 25 or 26, a pair of coil springs 35 are provided. The coil springs 35 each have one end connected to the bolt 30, and the other ends of the coil springs 35 are arranged in engagement with the lock pin 34. The pair of arms 27 are maintained in their proper position with respect to each other by means of a suitable bolt-and-nut assembly 36, Figure 3.

The wheel assembly of the present invention is adapted to be used for preventing the cutter from digging into the lawn or for maintaining the lawnmower horizontal when one of the side driving wheels 11 overhangs the edge of the lawn, as when it is desired to cut the edge of the lawn. Thus, to prevent the cutter from digging into the lawn, the wheel assembly is arranged as shown in the drawings, so that the wheel 28 is in its lowered position, whereby it will engage the lawn and coact with one of the side wheels 11 to support the lawnmower in a horizontal position. Thus, the lawnmower can be used for cutting the edge of a lawn. The coil springs 35 urge the lock pin 34 into the notch 26 so that the wheel 28 will be maintained in its supporting position. After the edge of the lawn has been trimmed or cut by the lawnmower, the wheel 28 can be moved to a raised or out-of-the-way position. To accomplish this, the pin 34 is moved out of the notch 26, against the tension of the coil springs 35, whereby the arms 27 can be pivoted or swung in a counterclockwise direction. Then, the lock pin 34 will be received in the other notch 25 so that the wheel 28 will be supported in an out-of-the-way position until needed again. With the wheel 28 in its raised or out-of-the-way position, it will be seen that the coil springs 35 now urge the lock pin 34 into the notch 25, so that the wheel 28 or arms 27 will not accidentally swing in a clockwise direction until the user requires or desires to use the wheel 28 for supporting the lawnmower.

I claim:

1. In a lawnmower, the combination with a rotary cutter, a stationary blade for coacting with said cutter, a horizontally disposed roller, side wheels, and a horizontally disposed tie rod extending between said side wheels, of a wheel mechanism operatively connected to said tie rod, said mechanism comprising a plate provided with a V-shaped recess for receiving therein one side of said tie rod, a bracket arranged on the other side of said tie rod and secured to said plate, a vertically disposed web projecting upwardly from said bracket, there being a notch in each end of said web, said web being provided with an opening intermediate its ends, a pair of channel-shaped arms arranged on opposite sides of said web, a securing element projecting through the opening in said web and into engagement with said arms for pivotally connecting said arms to said web, there being a slot in each of said arms, a lock pin projecting through said pair of slots and adapted to be seated in one of the notches of said web, a wheel mounted between the free ends of said arms, and coil springs for urging said pin into one of said notches.

2. In a lawnmower, the combination with a rotary cutter, a stationary blade for coacting with said cutter, a roller, side wheels, and a tie rod extending between said side wheels, of a wheel mechanism operatively connected to said tie rod, said mechanism comprising a plate provided with a recess for receiving therein one side of said tie rod, a bracket arranged on the other side of said tie rod and secured to said plate, a web projecting upwardly from said bracket, there being a notch in each end of said web, said web being provided with an opening intermediate its ends, a pair of arms arranged on opposite sides of said web, a securing element projecting through the opening in said web and into engagement with said arms for pivotally connecting said arms to said web, there being a slot in each of said arms, a lock pin projecting through said pair of slots and adapted to be seated in one of the notches of said web, a wheel mounted between the free ends of said arms, and coil springs for urging said pin into one of said notches.

THOMAS J. STAHL.

REFERENCES CITED

The following references are of record in the file of this patent:

FOREIGN PATENTS

| Number | Country | Date |
|--------|---------|------|
| 18,266 | Great Britain | of 1907 |